(12) United States Patent
Spinelli et al.

(10) Patent No.: US 10,984,664 B2
(45) Date of Patent: Apr. 20, 2021

(54) SYSTEM FOR DETERMINING POTENTIAL LANDING SITES FOR AIRCRAFT PRIOR TO LANDING ASSIST DEVICE DEPLOYMENT

(71) Applicant: The Boeing Company, Chicago, IL (US)

(72) Inventors: Charles B. Spinelli, Phoenix, AZ (US); Alvin L. Sipe, Newcastle, WA (US)

(73) Assignee: The Boeing Company, Chicago, IL (US)

(*) Notice: Subject to any disclaimer, the term of this patent is extended or adjusted under 35 U.S.C. 154(b) by 334 days.

(21) Appl. No.: 16/219,478

(22) Filed: Dec. 13, 2018

(65) Prior Publication Data

US 2020/0193849 A1  Jun. 18, 2020

(51) Int. Cl.
*G08G 5/02* (2006.01)
*G08G 5/00* (2006.01)
*G05D 1/06* (2006.01)

(52) U.S. Cl.
CPC ........... *G08G 5/025* (2013.01); *G05D 1/0676* (2013.01); *G08G 5/0021* (2013.01); *G08G 5/0056* (2013.01)

(58) Field of Classification Search
CPC .... G08G 5/025; G08G 5/0021; G08G 5/0056; G08G 5/0086; G05D 1/0676; G05D 1/0688
See application file for complete search history.

(56) References Cited

U.S. PATENT DOCUMENTS

| | | | |
|---|---|---|---|
| 7,689,328 B2 | 3/2010 | Spinelli | |
| 8,521,343 B2 | 8/2013 | Spinelli | |
| 8,594,932 B2 | 11/2013 | McIver et al. | |
| 8,798,922 B2 | 8/2014 | Tillotson et al. | |
| 9,257,048 B1 | 2/2016 | Offer et al. | |
| 9,520,066 B2 | 12/2016 | Spinelli et al. | |
| 9,932,111 B2 | 4/2018 | Spinelli | |
| 10,043,405 B1* | 8/2018 | Chartier | G08G 5/0021 |
| 2014/0343765 A1* | 11/2014 | Suiter | G08G 5/0021 701/18 |
| 2015/0254988 A1* | 9/2015 | Wang | B64D 47/08 701/3 |
| 2016/0027313 A1* | 1/2016 | Loussides | G01S 17/933 701/16 |
| 2016/0027314 A1* | 1/2016 | Stathis | G08G 5/025 701/461 |
| 2017/0345321 A1* | 11/2017 | Cross | B64D 45/08 |
| 2019/0051046 A1* | 2/2019 | Jin | G08G 5/045 |
| 2019/0066522 A1* | 2/2019 | Sweet, III | G08G 5/0021 |
| 2020/0172264 A1* | 6/2020 | Das | B64D 45/04 |

* cited by examiner

*Primary Examiner* — Richard M Camby
(74) *Attorney, Agent, or Firm* — Ostrager Chong Flaherty & Broitman P.C.

(57) ABSTRACT

Systems and methods for determining, prior to deployment of a landing assist device onboard an aircraft, the positions of potential landing sites for the aircraft. The positions of the potential landing sites are determined by a computer based at least in part on respective landing assist device deployment times and current wind data. The computed positions of potential landing sites are received by another computer or processor onboard that aircraft that is configured to control operation of a cockpit display unit within the field of view of the pilot. The display unit displays a map showing the respective positions of the aircraft at the respective landing assist device deployment times and the corresponding respective positions of the potential landing sites.

20 Claims, 6 Drawing Sheets

SYSTEM FOR DETERMINING POTENTIAL LANDING SITES FOR AIRCRAFT PRIOR TO LANDING ASSIST DEVICE DEPLOYMENT

BACKGROUND

This disclosure generally relates to systems and methods for landing an unguided aircraft at an unplanned landing site in the event of an in-flight contingency, such as engine out or a control system failure. As used herein, the term "unguided aircraft" means an aircraft which is moving without means for controlling the path of travel (the "trajectory"). In particular, this disclosure relates to systems and methods for determining potential landing sites for an aircraft prior to deployment of a landing assist device (e.g., a parachute).

Different types of emergency landings for powered aircraft exist. One type of emergency landing is a "forced landing". As used herein, the term "forced landing" refers to a situation wherein the aircraft is forced to make a landing due to technical problems, such as a major system failure has occurred or is imminent. A dead-stick landing is a type of forced landing wherein an aircraft loses all and is forced to land without propulsive power.

All fixed-wing aircraft have some capability to glide (e.g., move horizontally while descending) with no engine power. After a loss of power, the pilot's goal is to maintain a safe airspeed and fly the descending aircraft to a landing spot within gliding distance. The area open for potential landing sites depends on the original altitude, local terrain, engine-out gliding capabilities of the aircraft, original airspeed and winds at various altitudes.

Many aircraft are equipped with rescue parachute systems, which are designed to protect occupants in the event of an emergency by enabling the aircraft to descend safely to the ground after deployment. These systems are effective in establishing an unguided controlled descent to an undetermined landing site. Due to the lack of control after deployment, a risk exists that the aircraft may land in a manner that endangers occupants of the aircraft and people and structures on the ground.

SUMMARY

The subject matter disclosed in some detail below is directed to systems and methods for determining, prior to deployment of a landing assist device onboard an aircraft, the positions on the Earth's surface (hereinafter "positions") of one or more potential landing sites for the aircraft. The positions of the potential landing sites are determined by a computer based at least in part on respective landing assist device deployment times and current wind data. The computer that computes the positions of potential landing sites may be located on the ground or onboard the aircraft. The computed positions of potential landing sites are received by another computer or processor onboard that aircraft that is configured to control operation of a cockpit display unit within the field of view of the pilot. The display unit displays a map showing the respective positions of the aircraft at the respective landing assist device deployment times and the corresponding respective positions of the potential landing sites.

The proposed control system helps mitigate the chances of landing in less desirable areas by giving the pilot the option to delay the deployment of the system while the aircraft is still controllable. The invention will graphically depict achievable landing sites and when to activate the safety system. Optionally the computer that computes the positions of the potential landing sites may be configured to ensure that when an unguided contingency is selected (e.g., activate a parachute or other system that supplies stability to the aircraft in distress), the landing site is not a hazard to the aircraft or to people or structures on the ground.

Although various embodiments of systems and methods for determining the positions of potential landing sites for an aircraft prior to deployment of a landing assist device will be described in some detail below, one or more of those embodiments may be characterized by one or more of the following aspects.

One aspect of the subject matter disclosed in detail below is a system comprising a display unit and a computer system configured to control operation of the display unit, wherein the computer system is configured to perform the following operations: (a) determine respective positions of potential landing sites for an aircraft based at least in part on respective landing assist device deployment times; and (b) control the display unit to display a map showing positions of the aircraft at the landing assist device deployment times and the positions of the potential landing sites in advance of deployment of a landing assist device. Optionally, the computer system is further configured to control the display unit to display symbology representing disapproved potential landing sites that may be hazardous.

In accordance with some embodiments of the system described in the immediately preceding paragraph, operation (a) comprises: computing a current velocity vector based at least in part on current wind data; computing a respective position and a respective altitude of the aircraft at each of the landing assist device deployment times based on the current velocity vector; and computing the positions of the potential landing sites based at least in part on the respective positions and altitudes of the aircraft at the landing assist device deployment times and the current wind data. In accordance with one proposed implementation of the system, the map comprises a graphical depiction representing terrain, symbology indicating the current position of the aircraft relative to the terrain, symbology indicating the positions of the aircraft at the respective delayed landing assist device deployment times, and symbology indicating the respective positions of the corresponding potential landing sites relative to the terrain.

Another aspect of the subject matter disclosed in detail below is a method for landing an aircraft comprising: (a) determining respective positions of potential landing sites for an aircraft based at least in part on respective landing assist device deployment times; (b) displaying onboard the aircraft a map showing positions of the aircraft at the landing assist device deployment times and the positions of the potential landing sites in advance of deployment of a landing assist device; (c) activating deployment of the landing assist device at one of the landing assist device deployment times; and (d) landing the aircraft with assistance from the landing assist device.

In accordance with some embodiments of the method described in the immediately preceding paragraph, step (a) comprises: computing a current velocity vector based at least in part on current wind data; computing a respective position and a respective altitude of the aircraft at each of the landing assist device deployment times based on the current velocity vector; and computing the positions of the potential landing sites based at least in part on the respective positions and altitudes of the aircraft at the landing assist device deployment times and the current wind data. The foregoing computing steps are performed by a computer located on the ground or onboard the aircraft. In accordance with one proposed implementation of the method, the map comprises a graphical depiction representing terrain, symbology indicating the current position of the aircraft relative to the terrain, symbology indicating the positions of the aircraft at the respective delayed landing assist device deployment times, and symbology indicating the respective positions of the corresponding potential landing sites relative to the terrain.

A further aspect of the subject matter disclosed in detail below is an aircraft comprising a landing assist device, a display unit and a computer system configured to control operation of the display unit, wherein the computer system is configured to perform the following operations: (a) determine respective positions of potential landing sites for an aircraft based at least in part on respective landing assist device deployment times; and (b) control the display unit to display a map showing positions of the aircraft at the landing assist device deployment times and the positions of the potential landing sites in advance of deployment of the landing assist device. In accordance with one proposed implementation, the map comprises a graphical depiction representing terrain, first symbology indicating the positions of the respective potential landing sites relative to the terrain, and second symbology indicating the positions of the aircraft at the respective landing assist device deployment times.

Other aspects of systems and methods for determining the positions of potential landing sites for an aircraft prior to deployment of a landing assist device are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

The problem of selecting a suitable landing site in the event of an in-flight contingency is a complex problem that has been exacerbated by the continued development of previously undeveloped, underdeveloped, and/or unoccupied areas. During an in-flight contingency, pilots have typically been limited to using their planning, experience, vision, and familiarity with a given area to select a landing site.

Illustrative embodiments of systems and methods for determining the positions of potential landing sites for an aircraft prior to deployment of a landing assist device are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The following detailed description is directed to systems, methods, and non-transitory tangible computer-readable storage media for determining potential landing sites for an aircraft whose landing assist device may soon be deployed upon a determination by the pilot or the avionics system that a forced landing is imminent.

According to embodiments described herein, the positions on the Earth's surface (hereinafter "positions") of one or more potential landing sites are computed and then a map is displayed that includes symbology representing the computed geographic positions correlated to different delays in the time when the landing assist device may be deployed. In particular, the control system executes an algorithm that begins with a data collection operation, wherein landing site data relating to the computed landing sites and/or aircraft data relating to aircraft position and performance are collected. The landing site data may include, but is not limited to, obstacle data, terrain data, weather data, traffic data, population data, and other data, all of which may be used to ensure that a selected landing site is safe. The aircraft data may include, but is not limited to, global positioning system (GPS) data, altitude, orientation, and airspeed data, glide profile data, aircraft performance data, and other information.

Figure 1:
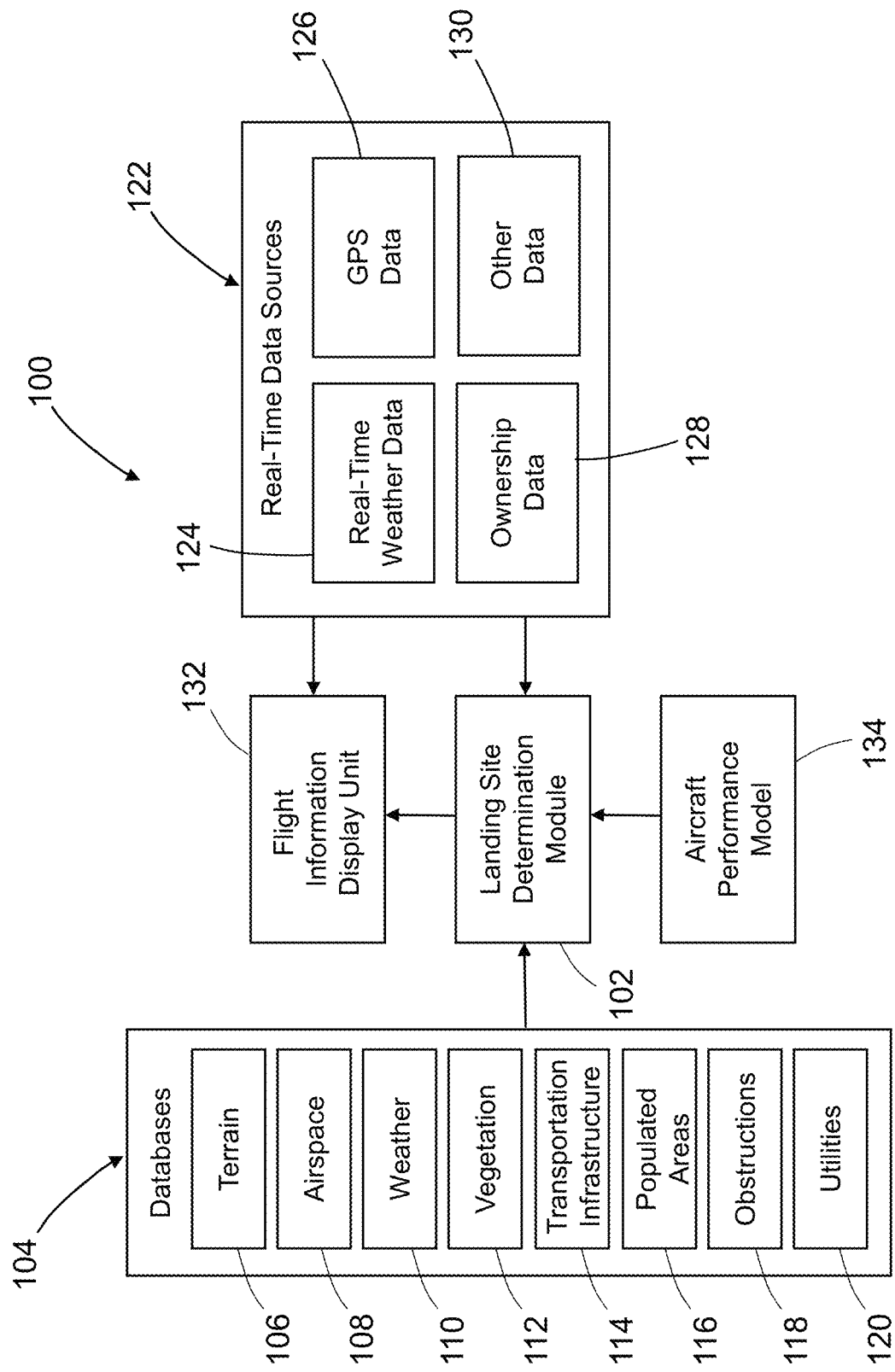
FIG. 1 is a block diagram identifying some components of a system for determining the positions of potential landing sites for an aircraft in accordance with one embodiment.

FIG. 1 is a block diagram identifying some components of a controlled descent guidance system 100 for determining and displaying the positions of potential landing sites for an aircraft in distress in accordance with one embodiment. The controlled descent guidance system 100 includes a landing site determination module 102. The landing site determination module 102 may be implemented as software hosted by a computer, such as an electronic flight bag, a personal computer, a portable computing device such as a notepad, netbook or tablet computing device, and/or across one or more computing devices, for example, one or more servers and/or web-based systems. The functionality of the landing site determination module 102 may be provided by systems onboard the aircraft or by systems located off-board (on the ground or onboard another aircraft). The landing site determination module 102 is configured to provide the functionality described herein including, but not limited to, displaying information for guiding a pilot to select a time when to deploy a landing assist device in order to achieve a safe landing.

The controlled descent guidance system 100 further includes one or more databases 104. While the databases 104 are illustrated as a unitary element, it should be understood that the controlled descent guidance system 100 may include multiple databases. Similarly, the databases 104 may include a memory or other storage device associated with or in communication with the landing site determination module 102, and may be configured to store a variety of data used by the landing site determination module 102. In the illustrated embodiment, the databases 104 store terrain data 106, airspace data 108, weather data 110, vegetation data 112, transportation infrastructure data 114, populated areas data 116, obstructions data 118, utilities data 120, and/or other data (not illustrated).

The terrain data 106 represents terrain at various landing sites, as well as along controlled descent paths to the landing sites. The terrain data 106 may be used to identify a safe landing site, taking into account terrain, e.g., mountains, hills, canyons, rivers, and the like. The airspace data 108 may indicate airspace that is available for generating one or more controlled descent paths to the landing sites. The airspace data 108 could indicate, for example, a military installation or other sensitive area over which the aircraft cannot legally fly. The weather data 110 may include data indicating weather information, particularly historical weather information, trends, and the like at various landing sites, as well as along controlled descent paths to the landing sites. The vegetation data 112 may include data indicating the position, height, density, and other aspects of vegetation at various landing sites, as well as along controlled descent paths to the landing sites, and may relate to various natural obstructions, including, but not limited to, trees, bushes, vines, and the like, as well as the absence thereof. The transportation infrastructure data 114 indicates positions of roads, waterways, rails, airports, and other transportation and transportation infrastructure information. The populated areas data 116 indicates population information associated with various positions, for example, a landing site and/or areas along a controlled descent path to the landing site. The populated areas data 116 may be important when considering a landing site as lives on the ground may be taken into account during the decision process. The obstructions data 118 may indicate obstructions at or around various landing sites, as well as obstructions along controlled descent paths to the landing sites. In some embodiments, the obstructions data include data indicating manmade obstructions such as power lines, cellular telephone towers, television transmitter towers, radio towers, power plants, stadiums, buildings, and other structures that could obstruct a controlled descent path to a landing site. The utilities data 120 may include data indicating any utilities at various landing sites, as well as along controlled descent paths to the landing sites. The utilities data 120 may indicate, for example, the positions, size, and height of gas pipelines, power lines, high-tension wires, power stations, and the like.

In accordance with some embodiments, the controlled descent guidance system 100 also includes one or more real-time data sources 122. The real-time data sources 122 may include data generated in real-time or near-real-time by various sensors and systems of or in communication with the aircraft. In the illustrated embodiment, the real-time data sources include real-time weather data 124, global positioning system (GPS) data 126, ownship data 128, and other data 130.

The real-time weather data 124 includes real-time or near-real-time data indicating weather conditions at the aircraft, at one or more landing sites, and along controlled descent paths terminating at the one or more landing sites. The GPS data 126 provides real-time or near-real-time positioning information for the aircraft, as is generally known. The ownship data 128 includes real-time navigational data such as heading, speed, altitude, trajectory, pitch, yaw, roll, and the like of the aircraft. The ownship data 128 may be updated continuously so that in the event of an engine or other system failure, the controlled descent guidance system 100 can determine and/or analyze the aircraft glide trajectory. The ownship data 128 further may include real-time or near-real-time data collected from various sensors and/or systems of the aircraft and may indicate airspeed, altitude, attitude, flaps and gear indications, fuel level and flow, heading, system status, warnings and indicators, and the like, at least some of which may be relevant to determining positions of potential landing sites as described herein. The other data 130 may include, for example, data indicating aircraft traffic at or near a landing site, as well as along a controlled descent path to the landing site, real-time airport traffic information, and the like.

The controlled descent guidance system 100 further includes an aircraft performance model 134. The aircraft performance model 134 provides the values of the aircraft performance aspects required by a trajectory engine (not shown in FIG. 1) to integrate the equations of motion. These values depend on the aircraft type for which the trajectory is being computed, the aircraft's current motion state (position, velocity, weight, etc.) and the current local atmospheric conditions. In addition, the performance values may depend on the intended operation of the aircraft, i.e., on the aircraft intent. For example, a trajectory engine may use the aircraft performance model to provide a value of the instantaneous rate of descent corresponding to a certain aircraft weight, atmospheric conditions (pressure altitude and temperature) and intended speed schedule (e.g. constant calibrated airspeed). The trajectory engine will also request from the aircraft performance model the values of the applicable limitations so as to ensure that the aircraft motion remains within the flight envelope. The aircraft performance model also provides other performance-related aspects that are intrinsic to the aircraft, such as flap and landing gear deployment times.

During operation of the aircraft, data retrieved from the databases 104, data retrieved from the real-time data sources 122, and/or an aircraft performance model 134 may be used by the controlled descent guidance system 100 to provide multiple layers of data on a flight information display unit 132 of the aircraft. The flight information display unit 132 may include any suitable display unit onboard the aircraft, such as an electronic flight bag display, a navigation display, a primary flight display, a heads up display, or a multifunction display unit for use by aircraft personnel. Additionally or alternatively, the data may be passed to the controlled descent guidance system 100 and/or to off-board personnel and systems, to identify safe landing sites, to analyze the safe landing sites, and to select a landing site and a controlled descent path to the safe landing sites. In some embodiments, the landing site and controlled descent path information may be passed to the flight information display unit 132 (or other display unit). As will be described below, the flight information display unit 132 (or other display unit) may display a terrain map with symbology to aid a pilot or other aircraft personnel in determining when to deploy a landing assist device while the aircraft is gliding (without propulsive power) to achieve a desired landing point. Additionally, the data may be transmitted to off-board personnel and/or systems.

Figure 2:
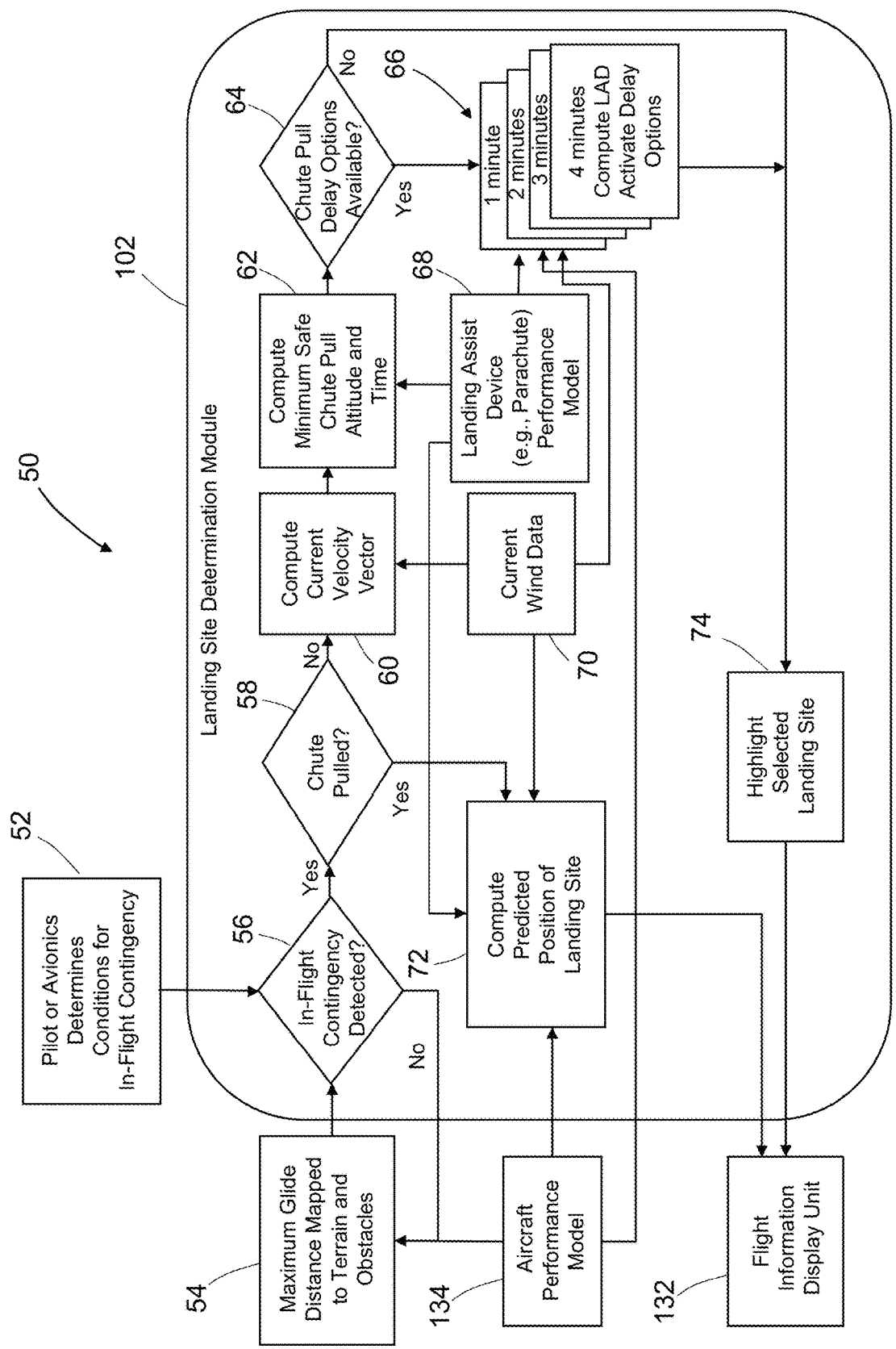
FIG. 2 is a flowchart identifying some operations performed by a landing site determination module in accordance with one proposed implementation.

FIG. 2 is a flowchart identifying some steps of an algorithm 50 for determining positions of potential landings sites in accordance with one proposed implementation. These operations are performed by the landing site determination module 102. During an in-flight contingency, a routing tool uses information from the aircraft performance model 134 to determine the maximum glide distance of the aircraft in all directions based on the current altitude of the aircraft and then maps the maximum glide distance to a map of the terrain (hereinafter "terrain map") and obstacles in the glide area (step 54). A maximum glide distance line (not shown in FIG. 2, but see maximum glide distance line 6 in FIG. 3) is displayed on the screen of the flight information display unit 132.

While the aircraft is flying, the pilot or an avionics system determines whether the conditions for in-flight contingency exist or not (step 52). The landing site determination module 102 receives a status signal indicating whether the conditions for an in-flight contingency exist or not. The landing site determination module 102 is configured to take action in dependence on the state of the received status signal. In step 56 of the algorithm 50, the landing site determination module 102 determines whether an in-flight contingency has been detected or not. If a determination is made in step 56 that an in-flight contingency has not been detected, the landing site determination module 102 continues to display the terrain map with maximum glide distance line, symbology (e.g., a white isosceles triangle) indicating the current position of the aircraft (see aircraft symbol 8 in FIG. 3) and symbology (e.g., a straight or curved line) indicating the predicted trajectory (in two dimensions, not including altitude) of the aircraft during gliding (see, e.g., predicted trajectory line 12 in FIG. 3).

If a determination is made in step 56 that an in-flight contingency has been detected, the landing site determination module 102 then determines in step 58 whether the landing assist device (not shown in FIG. 2, but see landing assist device 40 in FIG. 6) has been deployed or not (in this example, whether a parachute has been pulled or not). If a determination is made in step 56 that the landing assist device has been deployed, then the landing site determination module 102 computes a predicted position of the site where the aircraft (in controlled descent mode) will land. If the engine is out, then the predicted position is computed based on the current latitude, longitude and altitude of the aircraft, a landing assist device performance model 68 (hereinafter "LAD performance model 68") and current wind data 70. If the aircraft still has some engine power, then the position prediction also may take into account the aircraft performance model 134, current engine power and current velocity vector. The landing site determination module 102 is further configured to cause the flight information display unit 132 to display symbology indicating the predicted position of the landing site resulting from the computations performed in step 72.

Figure 3:
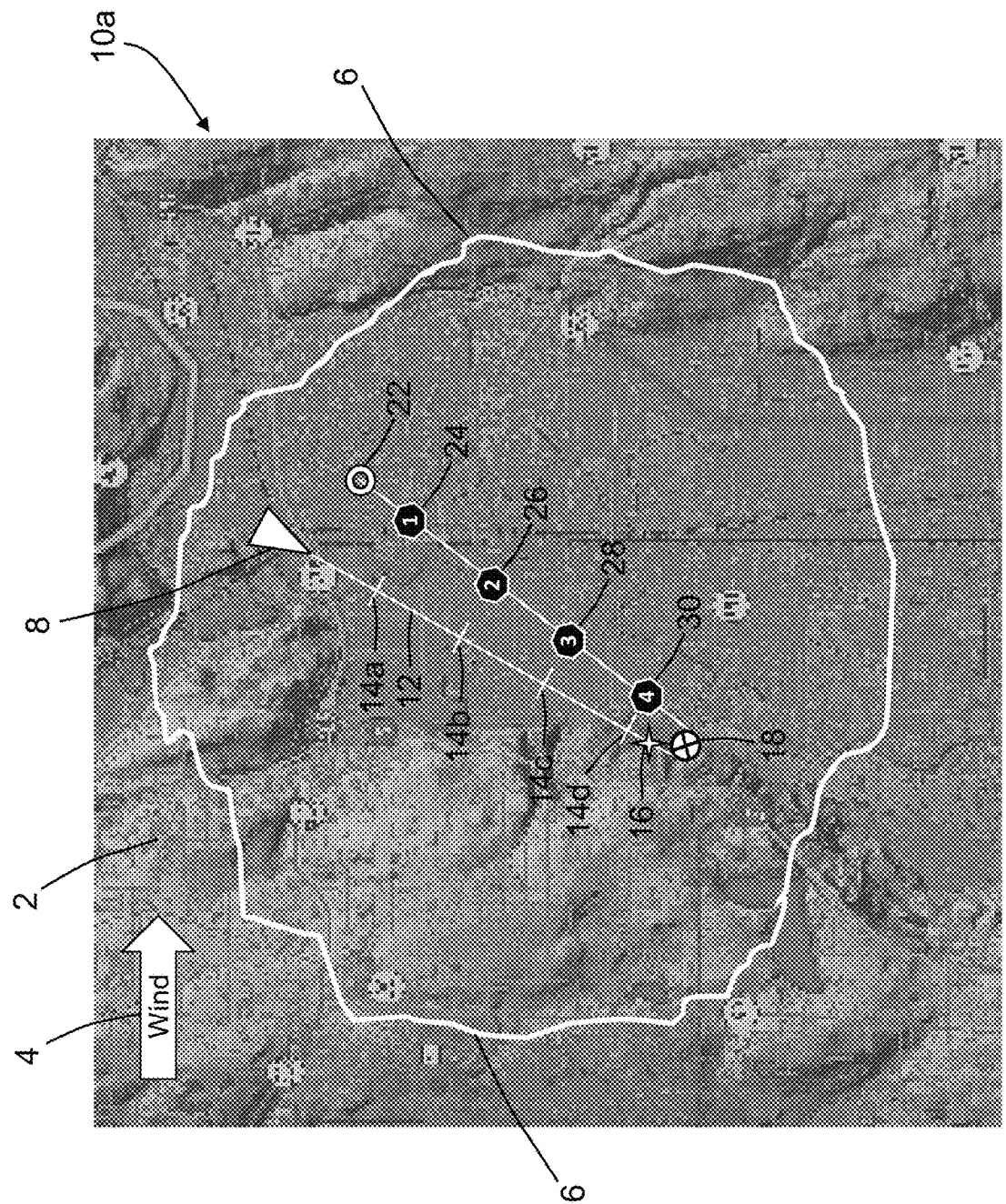
FIG. 3 is a diagram representing a screenshot displayed by a flight information display unit at a first instant in time, the screenshot including a terrain map, a wind vector symbol and symbology indicating positions of potential landing sites (relative to a current position of the aircraft). In the scenario depicted in FIG. 3, the aircraft is gliding along a straight path and the landing assist device has not yet been deployed.

If a determination is made in step 58 that the landing assist device has not been deployed yet, then the landing site determination module 102 computes a current velocity vector of the aircraft based on the current heading, groundspeed and rate of descent of the aircraft and the current wind data 70 (step 60). The current velocity vector is then used to determine the orientation of the aircraft symbol 8 and the predicted trajectory line 12 (in cases where the predicted trajectory is a straight line) when displayed on the screen of the flight information display unit 132, as seen in FIG. 3. Optionally, step 60 may be performed before instead of after step 58, which enables the current velocity vector to be used in step 72.

After the current velocity vector has been calculated in step 60, the minimum safe altitude (hereinafter "minimum safe deploy LAD altitude") and corresponding time for safe deployment of the landing assist device 40 (in this example, safe pulling of the parachute) are computed by the landing site determination module 102 (step 62). Based on the results of the computations in step 62, the landing site determination module 102 causes the flight information display unit 132 to display (see FIG. 3) a symbol 16 (e.g., a star shape) indicating the position at which the aircraft is calculated to be at the minimum safe deploy LAD altitude and a symbol 18 (e.g., an encircled x) indicating the predicted position of the landing site resulting from deployment of the LAD at the minimum safe deploy LAD altitude. As seen in FIG. 3, the symbol 16 is located along the predicted trajectory line 12, whereas the symbol 18 is not located along the predicted trajectory line 12. The minimum safe deploy LAD altitude is retrieved from the LAD performance model 68. The predicted position of the landing site resulting from deployment of the LAD at the minimum safe deploy LAD altitude is computed based on the current latitude, longitude and altitude of the aircraft, the LAD performance model 68 (which contains information regarding the rate of descent as a function of gross weight of the aircraft) and the wind current data 70 (which contains information regarding the rate at which the wind is pushing the parachuting aircraft in a particular direction). If the aircraft still has some engine power, then the position prediction also may take into account the aircraft performance model 134, current engine power and current velocity vector.

In a separate (optional) step not shown in FIG. 2 (or as part of step 62), the landing site determination module 102 also determines the predicted position of a landing site if the LAD were to be deployed immediately while the aircraft is in the current position indicated by aircraft symbol 8 in FIG. 3. Based on the results of these computations, the landing site determination module 102 causes the flight information display unit 132 to display (see FIG. 3) a symbol 22 (e.g., a white annular ring) indicating the predicted position of the landing site resulting from immediate deployment of the LAD 40.

After the predicted position of the landing site resulting from deployment of the LAD at the minimum safe deploy LAD altitude has been computed in step 62, the landing site determination module 102 determines whether LAD deployment delay options (in this example, parachute pull delay options) are available or not (step 64). If a determination is made in step 64 that LAD deployment delay options are not available (meaning that the altitude of the aircraft is too close to the minimum safe LAD deployment altitude), then the symbols 8, 12, 16 and 18 are displayed on the screen of the flight information display unit 132 without symbology indicating the predicted positions of optional landing sites. If a determination is made in step 64 that LAD deployment delay options are available, then the landing site determination module 102 determines (e.g., by performing computations) respective positions of potential landing sites for an aircraft based at least in part on respective landing assist device deployment times which are separated by an interval of time (e.g., one minute) (step 66). Based on the results of the computations in step 66, the landing site determination module 102 causes the flight information display unit 132 to display respective symbols 24, 26, 28 and 30 (e.g., seven-sided polygons respectively numbered 1, 2, 3 and 4 seen in FIG. 3) indicating the respective predicted positions of the landing sites resulting from deployment of the LAD with respective time delays of one, two, three and four minutes. Each predicted position of a potential landing site is computed based on the current latitude, longitude and altitude of the aircraft, the LAD performance model 68 and the wind current data 70. If the aircraft still has some engine power, then the position prediction also may take into account the aircraft performance model 134, current engine power and current velocity vector.

In addition, the landing site determination module 102 causes the flight information display unit 132 to display respective symbols 14a, 14b, 14c and 14d along the predicted trajectory line 12 (e.g., hashmarks that intersect the predicted trajectory line 12 at equally spaced points) indicating the respective positions of the gliding aircraft at the respective delayed times of LAD deployment. In the case of a dead-stick landing, the movement of the aircraft from one of the positions indicated by symbols 14a-14d to the corresponding position of the landing site indicated by the corresponding one of symbols 24, 26, 28 and 30 may be attributable entirely to the propulsive effects of the wind field.

In the case of a manned aircraft with engine out, the pilot may choose one of the potential landing sites and then deploy the landing assist device at the indicated position of the aircraft corresponding to the corresponding deployment time. The pilot may use visual cues and any other information to determine which potential landing site to choose. For instance, if the choice were between landing in water or in trees, the various factors to be weighed may include the kind of trees, whether life jackets are onboard or not, the swimming abilities of the passengers, etc.

To aid the pilot in decision-making, the landing site determination module 102 may be optionally configured to highlight the displayed symbology for one or more selected potential landing sites (step 74 in FIG. 2). In one proposed implementation, safe landing sites which are free of obstructions or other hazardous conditions may be highlighted, e.g., by changing the color of the symbols representing these approved landing sites. In an alternative proposed implementation, unsafe landing sites which have obstructions or other hazardous conditions may be highlighted, e.g., by changing the color of the symbols representing these disapproved landing sites. For example, the landing site determination module 102 may be configured to search the databases 104 (see FIG. 1) for any hazardous terrain, obstructions, populated areas, utilities, etc. at or in proximity to the potential landing sites and then highlight hazardous landing sites which are to be avoided.

To summarize the foregoing proposed implementation, the landing site determination module 102 is configured to: (a) compute the current velocity vector based at least in part on the current heading, groundspeed and rate of descent of the aircraft and the current wind data 70; and (b) compute respective positions and altitudes of the aircraft at each of one of a plurality of landing assist device deployment times based at least in part on the current latitude, longitude and altitude of the aircraft, the current velocity vector and the wind current data 70. In the event that all engines are out and the aircraft will be in a controlled descent mode following LAD deployment, the landing site determination module 102 is further configured to compute the positions of the potential landing sites based at least in part on the respective positions (latitudes and longitudes) and altitudes of the aircraft at the landing assist device deployment times, the LAD performance model 68 and the wind current data 70.

In the event that the engine is still running (e.g., either partial power or loss of a control surface), the landing site determination module 102 is configured to generate a respective spanning tree for each potential landing site by producing a plurality of possible approach paths starting at a touchdown point on the identified landing site and building each of the plurality of possible approach paths from the touchdown point outward while minimizing altitude changes, as disclosed in U.S. Pat. No. 9,520,066 (the disclosure of which is incorporated by reference herein in its entirety). The landing site determination module 102 may be further configured to identify obstructions in proximity to the identified potential landing site and eliminate any obstructed approach paths of the plurality of possible approach paths that conflict with the obstructions to produce a plurality of allowed approach paths to the touchdown point.

FIG. 3 is a diagram representing a screenshot 10a (displayed by the flight information display unit 132 at a first instant in time) including a terrain map 2 and an aircraft symbol 8 (e.g., in the form of a white isosceles triangle) which is positioned on the terrain map 2 to indicate the current position of the aircraft relative to the underlying terrain on the Earth's surface). The screenshot 10a further includes a wind vector symbol 4 indicating at least a direction of the wind in the airspace in which the aircraft is flying. In the scenario depicted in FIG. 3, the aircraft is gliding along a straight path (indicated by a predicted trajectory line 12) and the landing assist device has not yet been deployed. The screenshot 10a further includes a maximum glide distance line 6 that indicates a maximum glide distance from the current position of the aircraft (indicated by the aircraft symbol 8). The screenshot 10a shown in FIG. 3 further includes symbology 18, 22, 24, 26, 28 and 30 indicating positions of potential landing sites (relative to a current position of the aircraft) if the landing assist device were to be deployed immediately or after a delay.

The symbol 18 represents the landing site that would result if the LAD were to be deployed at the minimum safe deploy LAD altitude. More specifically, the symbol 18 (e.g., an encircled x) indicates the predicted position of the landing site resulting from deployment of the LAD at the minimum safe deploy LAD altitude. The screenshot 10a further includes a symbol 16 (e.g., a star shape) indicating the position where the aircraft is calculated to be at the minimum safe deploy LAD altitude. As seen in FIG. 3, the symbol 16 is located along the predicted trajectory line 12, whereas the symbol 18 is not located along the predicted trajectory line 12.

The symbol 22 (e.g., a white annular ring) represents the landing site that would result if the LAD is deployed immediately. The aircraft symbol 8 in FIG. 3 indicates the current (immediate) position of the aircraft relative to the underlying terrain.

In contrast to immediate deployment, symbols 24, 26, 28 and 30 (e.g., seven-sided polygons respectively numbered 1, 2, 3 and 4 in FIG. 3) represent the respective landing sites that would result if the LAD deployment were delayed one or more time units. More specifically, the symbol 24 represents the landing site that would result if the LAD deployment were delayed one time unit (e.g., one minute). The symbol 26 represents the landing site that would result if the LAD deployment were delayed two time units (e.g., two minutes). The symbol 28 represents the landing site that would result if the LAD deployment were delayed three time units (e.g., three minutes). The symbol 30 represents the landing site that would result if the LAD deployment were delayed four time units (e.g., four minutes). In addition to distinguishing the respective landing sites based on the respective durations of the time delays, the symbols 24, 26, 28 and 30 indicate the respective predicted positions of the landing sites resulting from deployment of the LAD with different time delays.

Still referring to FIG. 3, the aircraft positions at the delayed times for LAD deployment are respectively indicated by symbols 14*a*, 14*b*, 14*c* and 14*d* arranged along the predicted trajectory line 12 (e.g., hashmarks that intersect the predicted trajectory line 12 at equally spaced points). For example, the symbol 24 indicates the predicted position of the landing site if the LAD is deployed (with a delay of one minute) when the aircraft is at the position indicated by symbol 14*a*; the symbol 26 indicates the predicted position of the landing site if the LAD is deployed (with a delay of two minutes) when the aircraft is at the position indicated by symbol 14*b*; the symbol 28 indicates the predicted position of the landing site if the LAD is deployed (with a delay of three minutes) when the aircraft is at the position indicated by symbol 14*c*; and the symbol 30 indicates the predicted position of the landing site if the LAD is deployed (with a delay of four minutes) when the aircraft is at the position indicated by symbol 14*d*.

The graphical depiction presented on the screen of the flight information display unit 132 will continuously change as the aircraft continues to move. More specifically, the aircraft symbol 8 will move (and other symbols may move) on the screen; some symbols do not move or change (e.g., symbols 14*b*-14*d*, 16 and 18); some symbols (e.g., symbols 14*a*, 14*b*, 22 and 24) will disappear with the passage of time; and other symbols (e.g., symbols 26, 28 and 30) may change shape or numbering (also the addition of new symbols is not precluded).

Figure 4:
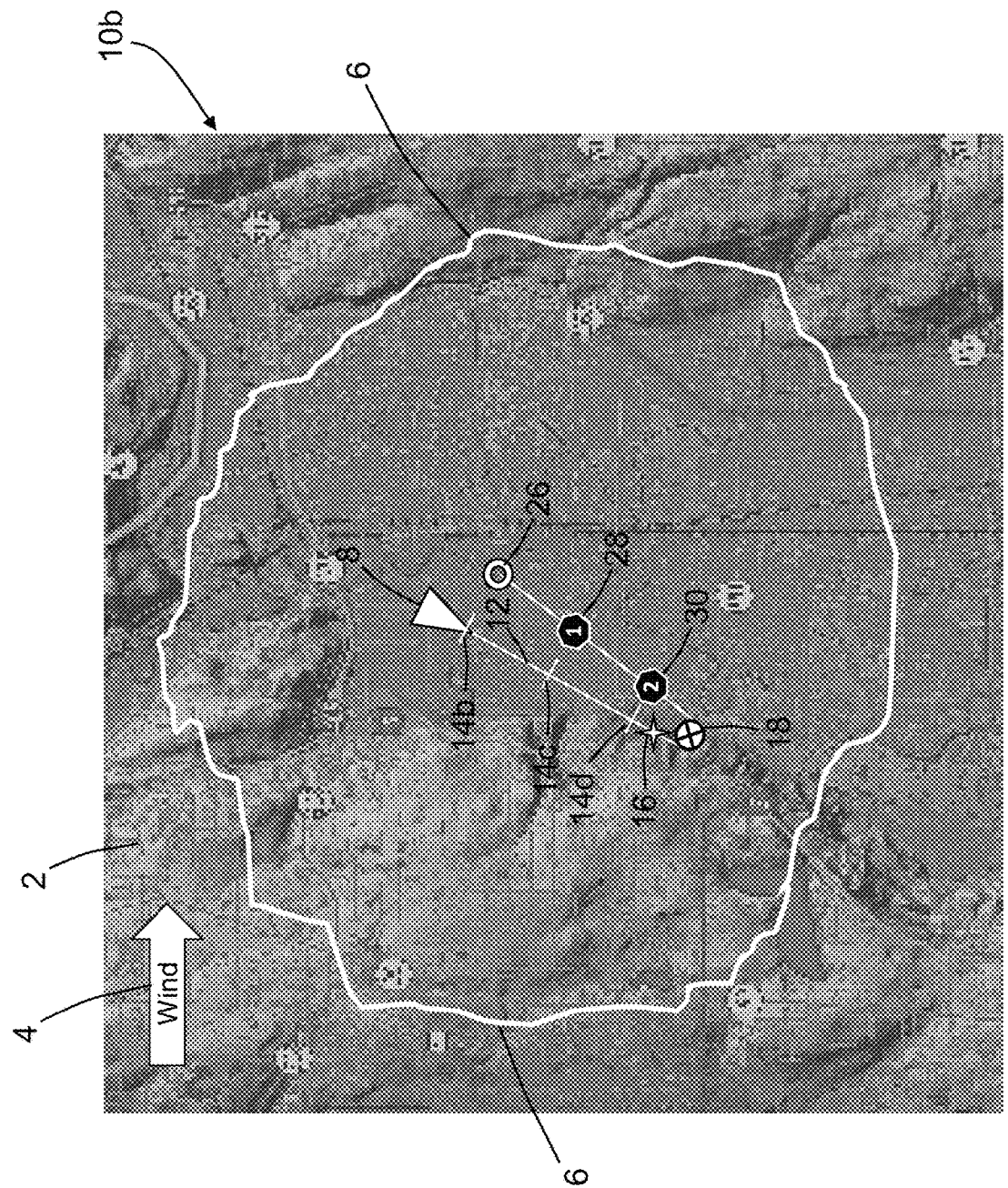
FIG. 4 is a diagram representing a screenshot displayed by a flight information display unit at a second instant in time subsequent to the first instant in time, the screenshot including a terrain map, a wind vector symbol and symbology indicating positions of potential landing sites (relative to a current position of the aircraft). In the scenario depicted in FIG. 4, the aircraft is gliding along the same straight path depicted in FIG. 3 (but at a later time) and the landing assist device has still not been deployed.

For example, FIG. 4 is a diagram representing a screenshot 10*b* displayed by the flight information display unit 132 at a second instant in time subsequent to the first instant in time. In the scenario depicted in FIG. 4, the aircraft is gliding along the same straight path depicted in FIG. 3 (but at a later time) and the landing assist device has still not been deployed. The symbology presented in screenshot 10*b* differs from the symbology presented in screenshot 10*a* in the following respects: (1) the aircraft symbol 8 has moved; (2) the symbols 14*b*-14*d*, 16 and 18 have not moved or changed; (3) symbols 14*a*, 14*b*, 22 and 24 have disappeared; (d) symbol 26 has changed from a seven-sided polygon with a number to a white annular ring (indicating the position of the landing site if the LAD were deployed at the second instant in time); and (e) the numbering of symbols 28 and 30 has changed from 3 and 4 respectively (third and fourth options at the first instant in time) to 1 and 2 respectively (first and second options at the second instant in time).

Figure 5:
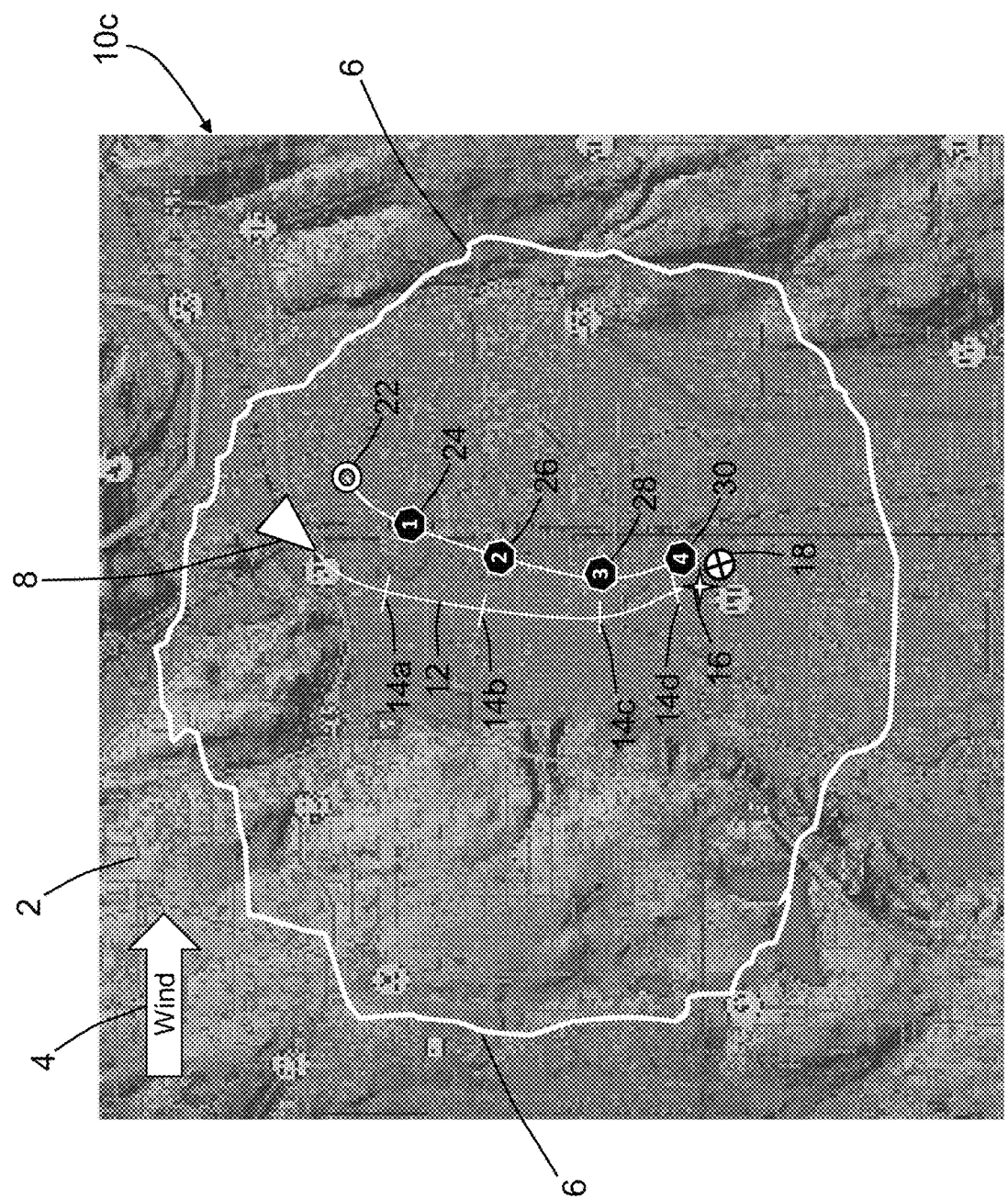
FIG. 5 is a diagram representing a screenshot displayed by a flight information display unit, the screenshot including a terrain map, a wind vector symbol and symbology indicating positions of potential landing sites (relative to a current position of the aircraft). In the scenario depicted in FIG. 5, the aircraft is gliding along a curved line and the landing assist device has not yet been deployed.

FIG. 5 is a diagram representing a screenshot 10*c* displayed by a flight information display unit 132, the screenshot 10*c* including all of the same symbology seen in FIG. 3, with the only differences being attributable to the fact that the aircraft is making a left turn, gliding along a curved line instead of a straight path.

At an instant in time when the pilot is viewing a screenshot of the type depicted in FIGS. 3-5, the pilot is presented with symbology representing the respective landing sites that would result from if a respective deployment delay option were selected. In addition, symbols representing obstructions or other features may be mapped to the terrain map 2 in the screen shot 10. When the pilot sees that a symbol representing a landing site and a symbol representing an obstruction or other factor are at the same position on the terrain map, then the pilot may be considered to be forewarned that the LAD should not be deployed at the delayed time corresponding to that landing site. Thus the pilot may avoid deploying the LAD at that delayed time. In addition or in the alternative, the terrain map 2 may indicate the presence of terrain which is unsuitable for a landing site (e.g., a body of water), in which case the pilot may decide to avoid deploying the LAD at a time may result in the aircraft landing in water.

In accordance with some embodiments, aircraft personnel are able to involve Air Traffic Control (ATC), Airborne Operations Centers (ADCs), and/or Air Route Traffic Control Centers (ARTCCs) in the identification, analysis, and/or selection of suitable landing sites. The ATC, AOCs, and/or ARTCCs may be configured to monitor and/or control an aircraft involved in an emergency situation, if desired. The controlled descent guidance system 100 may be configured to report aircraft status according to a predetermined schedule or upon occurrence of trigger events. The controlled descent guidance system 100 interfaces with an ATC, ARTCC, or AOC to exchange information on potential landing sites as the flight progresses, or for allowing the ATC or AOC to monitor or control an aircraft in distress, or to potentially reroute other aircraft in the area to enhance safety. The controlled descent guidance system 100 may be configured to determine, in real-time, potential landing sites with the assistance of an off-board computer system such as, for example, a system associated with an ATC, ARTCC, or AOC. The landing site determination module 102 may transmit or receive the information over the current flight operations bulletin messaging system or some other system.

The ATC, ARTCC, and/or AOC have the capability to uplink information on potential emergency landing sites before the pilot deploys the landing assist device. For example, the ATC, ARTCC, and/or AOC may use data in the databases 104 and data from the real-time data sources 122 to determine a landing site for the aircraft. Information relating to the landing sites may be uplinked by any number of uplink means to the aircraft. The ATC, ARTCC, and/or AOC broadcast the information at regular intervals, when an emergency is reported, and/or when a request from authorized aircraft personnel is originated.

In another embodiment the aircraft broadcasts potential landing sites to the ATC, ARTCC, or AOC as the aircraft progresses on its flight. Alternatively, the aircraft broadcasts only when there is an emergency or when a request for information is made from the ATC, ARTCC, or AOC. Thus, the ATC, ARTCC, or AOC may identify, in real-time or near-real-time, the chosen landing site of an aircraft posting an emergency. If appropriate, other traffic may be re-routed to ensure a safe ingress to the chosen landing site. It should be understood that the aircraft and the ATC, ARTCC, or AOC may have continuous, autonomous, and instantaneous information on the choices of landing sites, thereby adding an extra layer of safety to the landing site determination module 102.

Figure 6:
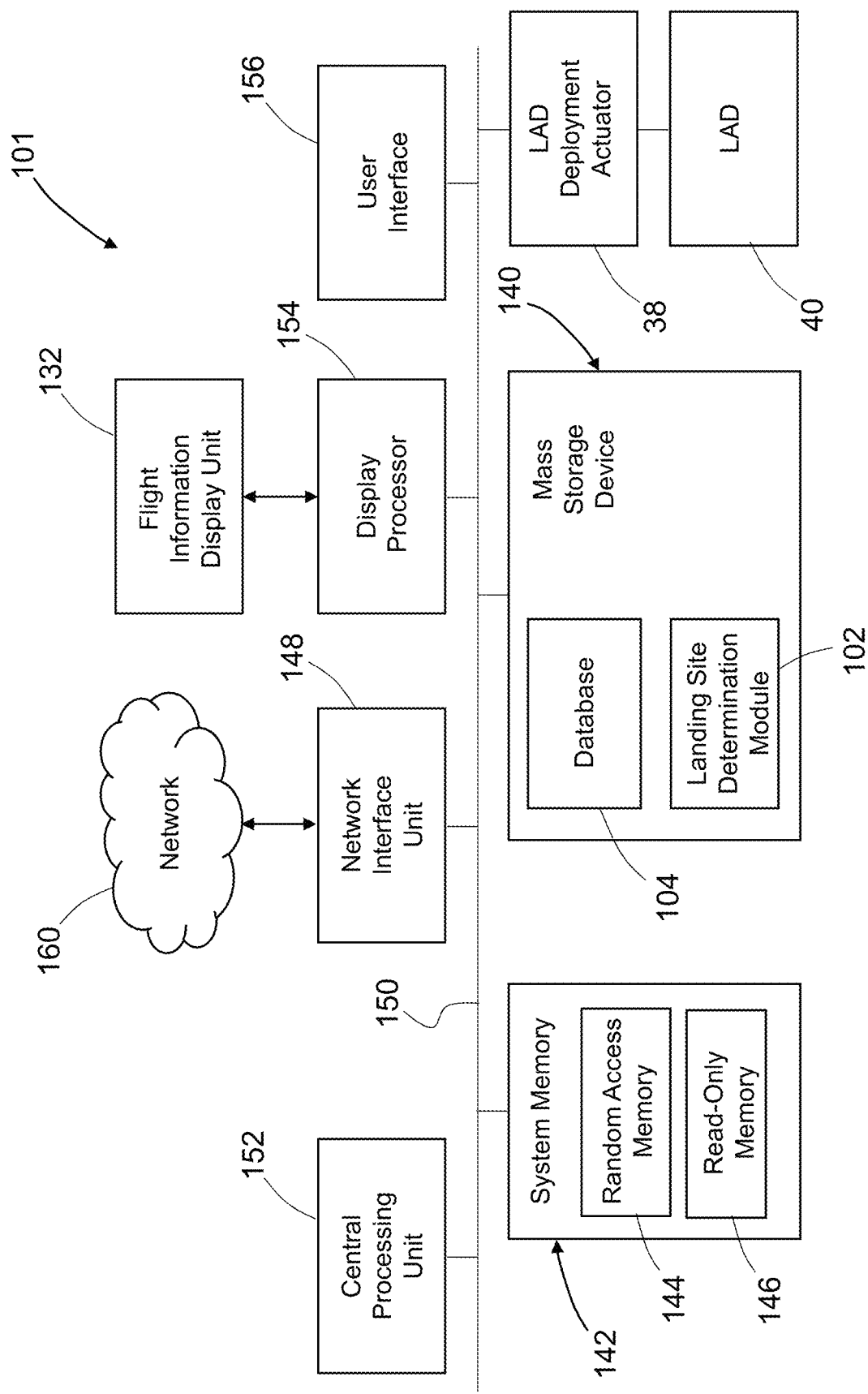
FIG. 6 is a block diagram identifying some components of a computerized system for determining the positions of potential landing sites for an aircraft in accordance with one proposed implementation.

FIG. 6 is a block diagram identifying some components of a landing assistance system 101 connected to a network 160 in accordance with one proposed implementation. The landing assistance system 101 includes a system bus 150 which is communicatively coupled to the network 160 by way of a network interface unit 148. The landing assistance system 101 includes computer hardware (e.g., central processing units 152) programmed to execute the algorithm described herein for determining landing sites for the aircraft in the event of an imminent forced landing. The landing assistance system 101 further includes a landing assist device 40 (e.g., a parachute) and an actuator 38 configured to deploy the landing assist device 40 in response to receipt of a deployment actuation signal sent to the actuator 38 via the system bus 150. The deployment actuation signal may be generated by the user interface 156 in response to pilot input of an appropriate command.

The landing assistance system 101 may include a single computing device or a combination of one or more processing units, storage units, and/or other computing devices implemented in the avionics systems of the aircraft. In the example depicted in FIG. 6, the landing assistance system 101 includes one or more central processing units 152 (hereinafter "CPUs 152"), a system memory 142, including a random access memory 144 ("RAM") and a read-only memory 146 ("ROM"), and a system bus 150 that couples the memory to the CPUs 152. The CPUs 152 may be standard programmable processors that perform arithmetic and logical operations necessary for the operation of the landing assistance system 101. The CPUs 152 may be configured to determine respective positions of potential landing sites for the aircraft based at least in part on respective landing assist device deployment times and then send that information to the display processor 154. The display processor 154 is in turn configured to control the flight information display unit 132 to display a map showing positions of the aircraft at the landing assist device deployment times and the positions of the potential landing sites in advance of deployment of the landing assist device 40.

The landing assistance system 101 also includes a mass storage device 140. The mass storage device 140 may be connected to the CPUs 152 through a mass storage controller (not shown) further connected to the system bus 150. The mass storage device 140 and its associated non-transitory tangible computer-readable storage media provide non-volatile storage for the landing assistance system 101. The mass storage device 140 may store various application modules or other program modules, such as the landing site determination module 102 and the databases 104 described above with reference to FIG. 1. The mass storage device 140 may also store data collected or utilized by the various systems and modules.

Although the description of computer-readable media contained herein refers to a mass storage device, such as a hard disk or CD-ROM drive, it should be appreciated by those skilled in the art that computer-readable media may be any available computer storage media that may be accessed by the landing assistance device 101. By way of example, and not limitation, computer-readable media may include volatile and non-volatile, removable and non-removable media implemented in any method or technology for storage of information such as computer-readable instructions, data structures, program modules, or other data.

According to various embodiments, the landing assistance system 101 may operate in a networked environment using logical connections to other avionics in the aircraft and/or to systems off-board the aircraft, which may be accessed through the network 160. The landing assistance system 101 includes a network interface unit 148 that communicatively couples the system bus 150 to the network 160. The network interface unit 148 may also be utilized to connect to other types of networks and remote computer systems.

The landing assistance system 101 depicted in FIG. 6 also includes a display processor 154 (e.g., a graphics processor) for controlling the flight information display unit 132 to display graphics and symbology configured to indicate the positions of potential landing sites relative to a current position of the aircraft, as described above with reference to FIGS. 3-5.

While systems and methods for determining the positions of potential landing sites for an aircraft prior to deployment of a landing assist device have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The embodiments disclosed above use one or more computer systems. As used in the claims, the term "computer system" comprises a single processing or computing device or multiple processing or computing devices that communicate via wireline or wireless connections. Such processing or computing devices typically include one or more of the following: a processor, a controller, a central processing unit, a microcontroller, a reduced instruction set computer processor, an application-specific integrated circuit, a programmable logic circuit, a field-programmable gated array, a digital signal processor, and/or any other circuit or processing device capable of executing the functions described herein. The above examples are exemplary only, and thus are not intended to limit in any way the definition and/or meaning of the term "computer system".

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A system comprising a display unit and a computer system configured to control operation of the display unit, wherein the computer system is configured to perform the following operations:

(a) determine respective positions of potential landing sites for an aircraft based at least in part on respective landing assist device deployment times; and (b) control the display unit to display a map showing positions of the aircraft at the landing assist device deployment times and the positions of the potential landing sites in advance of deployment of a landing assist device.

2. The system as recited in claim 1, wherein operation (a) comprises:

computing a current velocity vector based at least in part on current wind data;

computing a respective position and a respective altitude of the aircraft at each of the landing assist device deployment times based on the current velocity vector; and computing the positions of the potential landing sites based at least in part on the respective positions and altitudes of the aircraft at the landing assist device deployment times and the current wind data.

3. The system as recited in claim 1, wherein the map comprises a graphical depiction representing terrain and symbology indicating the positions of the respective potential landing sites relative to the terrain.

4. The system as recited in claim 3, wherein the map further comprises symbology indicating the positions of the aircraft at the respective landing assist device deployment times.

5. The system as recited in claim 4, wherein one of the landing assist device deployment times is a predicted time when the aircraft will be at a minimum safe altitude for deployment of the landing assist device.

6. The system as recited in claim 4, wherein the computer system is further configured to control the display unit to display symbology representing disapproved potential landing sites.

7. The system as recited in claim 4, wherein the map further comprises a line indicating a current velocity vector of the aircraft at a time prior to deployment of the landing assist device, the symbology indicating the positions of the aircraft at the respective landing assist device deployment times being spaced apart along the line.

8. A method for landing an aircraft comprising:

(a) determining respective positions of potential landing sites for an aircraft based at least in part on respective landing assist device deployment times;

(b) displaying onboard the aircraft a map showing positions of the aircraft at the landing assist device deployment times and the positions of the potential landing sites in advance of deployment of a landing assist device;

(c) activating deployment of the landing assist device at one of the landing assist device deployment times; and (d) landing the aircraft with assistance from the landing assist device.

9. The method as recited in claim 8, wherein step (d) comprises landing the aircraft at a position in proximity to the position of the potential landing site that is correlated to the one of the landing assist device deployment times.

10. The method as recited in claim 8, wherein at least steps (a) and (b) are performed by a computer system.

11. The method as recited in claim 8, wherein step (c) is performed by a pilot of the aircraft.

12. The method as recited in claim 8, wherein step (a) comprises:

computing a current velocity vector based at least in part on current wind data;

computing a respective position and a respective altitude of the aircraft at each of the landing assist device deployment times based on the current velocity vector; and computing the positions of the potential landing sites based at least in part on the respective positions and altitudes of the aircraft at the landing assist device deployment times and the current wind data.

13. The method as recited in claim 8, wherein the map comprises a graphical depiction representing terrain and symbology indicating the positions of the respective potential landing sites relative to the terrain.

14. The method as recited in claim 13, wherein the map further comprises symbology indicating the positions of the aircraft at the respective landing assist device deployment times.

15. The method as recited in claim 14, wherein one of the landing assist device deployment times is a predicted time when the aircraft will be at a minimum safe altitude for deployment of the landing assist device.

16. The method as recited in claim 14, wherein step (b) further comprises controlling the display unit to display symbology representing disapproved potential landing sites.

17. The method as recited in claim 14, wherein the map further comprises a line indicating a current velocity of the aircraft at a time prior to deployment of the landing assist device, the symbology indicating the positions of the aircraft at the respective landing assist device deployment times being spaced apart along the line.

18. An aircraft comprising a landing assist device, a display unit and a computer system configured to control operation of the display unit, wherein the computer system is configured to perform the following operations:

(a) determine respective positions of potential landing sites for an aircraft based at least in part on respective landing assist device deployment times; and (b) control the display unit to display a map showing positions of the aircraft at the landing assist device deployment times and the positions of the potential landing sites in advance of deployment of the landing assist device.

19. The aircraft as recited in claim 18 wherein operation (a) comprises:

computing a current velocity vector based at least in part on current wind data;

computing a respective position and a respective altitude of the aircraft at each of the landing assist device deployment times based on the current velocity vector; and computing the positions of the potential landing sites based at least in part on the respective positions and altitudes of the aircraft at the landing assist device deployment times and the current wind data.

20. The aircraft as recited in claim 18, wherein the map comprises a graphical depiction representing terrain, first symbology indicating the positions of the respective potential landing sites relative to the terrain, and second symbology indicating the positions of the aircraft at the respective landing assist device deployment times.

* * * * *